United States Patent
Honsowetz et al.

(10) Patent No.: US 10,862,413 B2
(45) Date of Patent: Dec. 8, 2020

(54) ELECTRICAL ASSEMBLY

(71) Applicant: Lear Corporation, Southfield, MI (US)

(72) Inventors: Eric Honsowetz, Redford, MI (US); Ronald Wilson, Detroit, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 16/402,404

(22) Filed: May 3, 2019

(65) Prior Publication Data

US 2020/0350841 A1    Nov. 5, 2020

(51) Int. Cl.
| | |
|---|---|
| *F03D 9/00* | (2016.01) |
| *H02P 7/03* | (2016.01) |
| *B60N 2/02* | (2006.01) |
| *B60N 2/10* | (2006.01) |
| *B60N 2/20* | (2006.01) |

(52) U.S. Cl.
    CPC ............. *H02P 7/04* (2016.02); *B60N 2/0232* (2013.01); *B60N 2/0244* (2013.01); *H02P 7/05* (2016.02); *B60N 2/10* (2013.01); *B60N 2/20* (2013.01)

(58) Field of Classification Search
    CPC .... H02P 7/04; H02P 7/05; B60N 2/12; B60N 2/0244; B60N 2/0232
    See application file for complete search history.

(56) References Cited

U.S. PATENT DOCUMENTS

| | | | |
|---|---|---|---|
| 5,187,665 A * | 2/1993 | Futami ................. | B60N 2/0248 296/65.16 |
| 6,094,021 A | 7/2000 | Noro et al. | |
| 6,153,990 A * | 11/2000 | Feil .......................... | H01H 9/38 318/280 |
| 6,222,362 B1 | 4/2001 | Schulter et al. | |
| 6,583,591 B2 | 6/2003 | Echols et al. | |
| 6,838,845 B2 | 1/2005 | Deinzer et al. | |
| 6,917,169 B2 | 7/2005 | Nagasawa et al. | |
| 6,927,549 B2 | 8/2005 | Ashiya et al. | |
| 7,023,683 B1 | 4/2006 | Guo et al. | |
| 7,157,874 B2 | 1/2007 | Nomura et al. | |
| 2002/0117982 A1 | 8/2002 | Jehn | |
| 2004/0217724 A1 * | 11/2004 | Nagasawa ................. | H02P 7/04 318/280 |

(Continued)

FOREIGN PATENT DOCUMENTS

| | | |
|---|---|---|
| DE | 19534715 A1 | 1/1997 |
| DE | 102014226156 A1 | 6/2016 |
| DE | 102016201283 A1 | 12/2016 |

(Continued)

*Primary Examiner* — Muhammad S Islam

(74) *Attorney, Agent, or Firm* — Fishman Stewart PLLC

(57) ABSTRACT

An electrical assembly includes a motor, a first switch, a second switch, a third switch, and a fourth switch. The first switch may be connected to a first contact of the motor, and/or the second switch may be connected to a second contact of the motor. The third switch may be connected to the first switch, and/or the fourth switch may be connected to the second switch. The first switch, the second switch, the third switch, and/or the fourth switch may be configured to switch the electrical assembly between a first state, a second state, and/or a third state. If the electrical assembly is in the first state, at least one of the first contact and/or the second contact of the motor may be connected to an open circuit, and/or the motor may be configured to rotate freely.

20 Claims, 4 Drawing Sheets

(56) References Cited

U.S. PATENT DOCUMENTS

2014/0268456 A1    9/2014    Mochizuki et al.
2018/0074541 A1    3/2018    Matsunaga

FOREIGN PATENT DOCUMENTS

| EP | 1902517 | B1 | 10/2011 |
| JP | 3214061 | B2 | 10/2001 |
| JP | 3812720 | B2 | 8/2006 |

* cited by examiner

ELECTRICAL ASSEMBLY

TECHNICAL FIELD

The present disclosure generally relates to electrical assemblies, including electrical assemblies that may be used in connection with electric motors and/or vehicles.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some electrical assemblies may be relatively complex and/or may not provide sufficient functionality. Some electrical assemblies may not be configured to control a motor in a first direction, a second direction, and/or allow the motor to freely rotate.

There is a desire for solutions/options that minimize or eliminate one or more challenges or shortcomings of electrical assemblies. The foregoing discussion is intended only to illustrate examples of the present field and should not be taken as a disavowal of scope.

SUMMARY

In embodiments, an electrical assembly may include a motor, a first switch, a second switch, a third switch, and/or a fourth switch. The first switch may be connected to a first contact of the motor, and/or the second switch may be connected to a second contact of the motor. The third switch may be connected to the first switch, and/or the fourth switch may be connected to the second switch. The first switch, the second switch, the third switch, and/or the fourth switch may be configured to switch the electrical assembly between a first state, a second state, and/or a third state. When the electrical assembly is in the first state, at least one of the first contact and the second contact of the motor may be connected to an open circuit, and/or the motor may be configured to rotate freely. When the electrical assembly is in the second state, the first switch may be configured to connect the motor to a power source to rotate the motor in a first direction. When the electrical assembly is in the third state, the motor may be connected to a power source and/or an electrical ground, and/or the motor may be configured to rotate in a second direction. When the electrical assembly is in the first state, the first switch may be configured to connect the first contact of the motor to an open contact of the third switch, and/or the second switch may be configured to connect the second contact of the motor to an open contact of the fourth switch.

With embodiments, when the electrical assembly is in the second state, the first switch may be configured to connect the first contact of the motor to a power source, and/or the second switch may be configured to connect the second contact of the motor to the fourth switch and/or an electrical ground. The motor may be configured to rotate in a first direction in the second state. When the electrical assembly is in the third state, the first switch may be configured to connect the first contact of the motor to the third switch and/or an electrical ground, and/or the second switch may be configured to connect the second contact of the motor to a power source. In the third state, the motor may be configured to rotate in a second direction.

In embodiments, the first switch, the second switch, the third switch, and/or the fourth switch may include a first contact, a second contact, and/or a third contact. The first switch, the second switch, the third switch, and/or the fourth switch may include a respective coil that may be configured to be energized by a controller. When the coils of the first switch, the second switch, the third switch, and/or the fourth switch are de-energized, the first contacts may be electrically connected with the third contacts. When the coils of the first switch, the second switch, the third switch, and/or the fourth switch are energized, the second contacts may be electrically connected with the third contacts. The electrical assembly may include a first resistor and/or a second resistor. The first resistor and/or the second resistor may be configured to detect a short of the motor.

With embodiments, when the electrical assembly is in the first position, the first switch may be configured to connect the first contact of the motor to an open contact of the third switch, and/or the second switch may be configured to connect the second contact of the motor to an open contact of the fourth switch. When the electrical assembly is in the second state, the first switch may be configured to connect the first contact of the motor to a power source, and/or the second switch may be configured to connect the second contact of the motor to the fourth switch and/or an electrical ground. The motor may be configured to rotate in a first direction in the second state. When the electrical assembly is in the third state, the first switch may be configured to connect the first contact of the motor to the third switch and/or an electrical ground, and/or the second switch may be configured to connect the second contact of the motor to the power source. In the third state, the motor may be configured to rotate in a second direction. The electrical assembly may include a seat that may be connected to the motor. The electrical assembly may include a controller configured to control movement of the seat and/or operation of the motor via the first switch, the second switch, the third switch, and/or the fourth switch.

In embodiments, a method of operating an electrical assembly may include providing a first switch, a second switch, a third switch, a fourth switch, and/or a motor. The method may include sending one or more signals to the first switch, the second switch, the third switch, and/or the fourth switch to switch the electrical assembly between a first state, a second state, and/or a third state. The first state may correspond to the motor disconnected from a power source and/or connected to an open circuit. The second state may correspond to the motor rotating in a first direction. The third state may correspond to the motor rotating in a second direction. The second switch, the third switch, and/or the fourth switch may be energized when the electrical assembly is in the second state. The first switch, the third switch, and/or the fourth switch may be energized when the electrical assembly is in the third state. The motor may be configured to be manually rotated when the electrical assembly is in the first state. Sending the one or more signals may include controlling movement of a seat that may be connected to the motor.

The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

Figure 1:
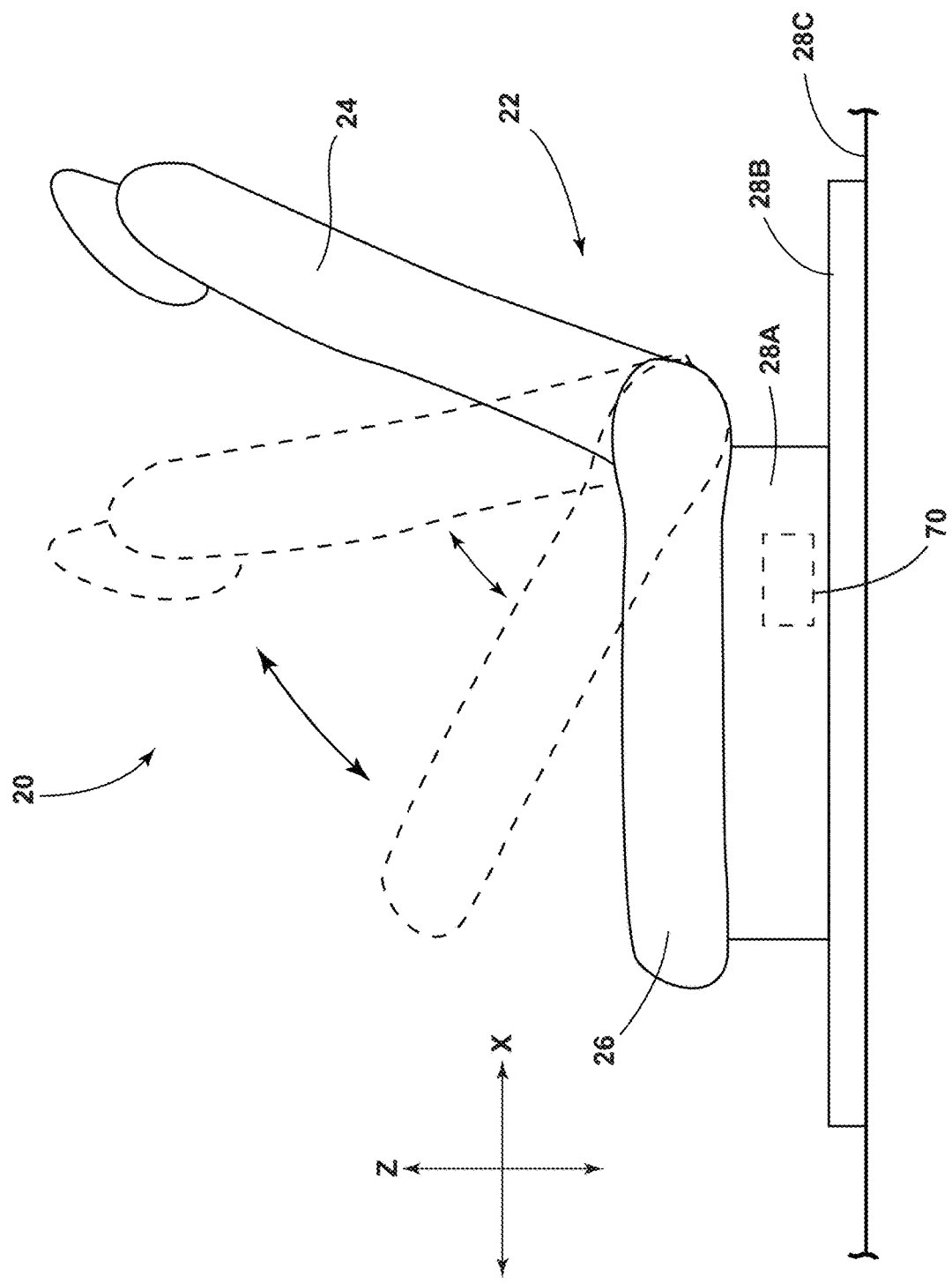
FIG. 1 is a side view generally illustrating portions of an embodiment of an electrical assembly according to teachings of the present disclosure.
Figure 2:
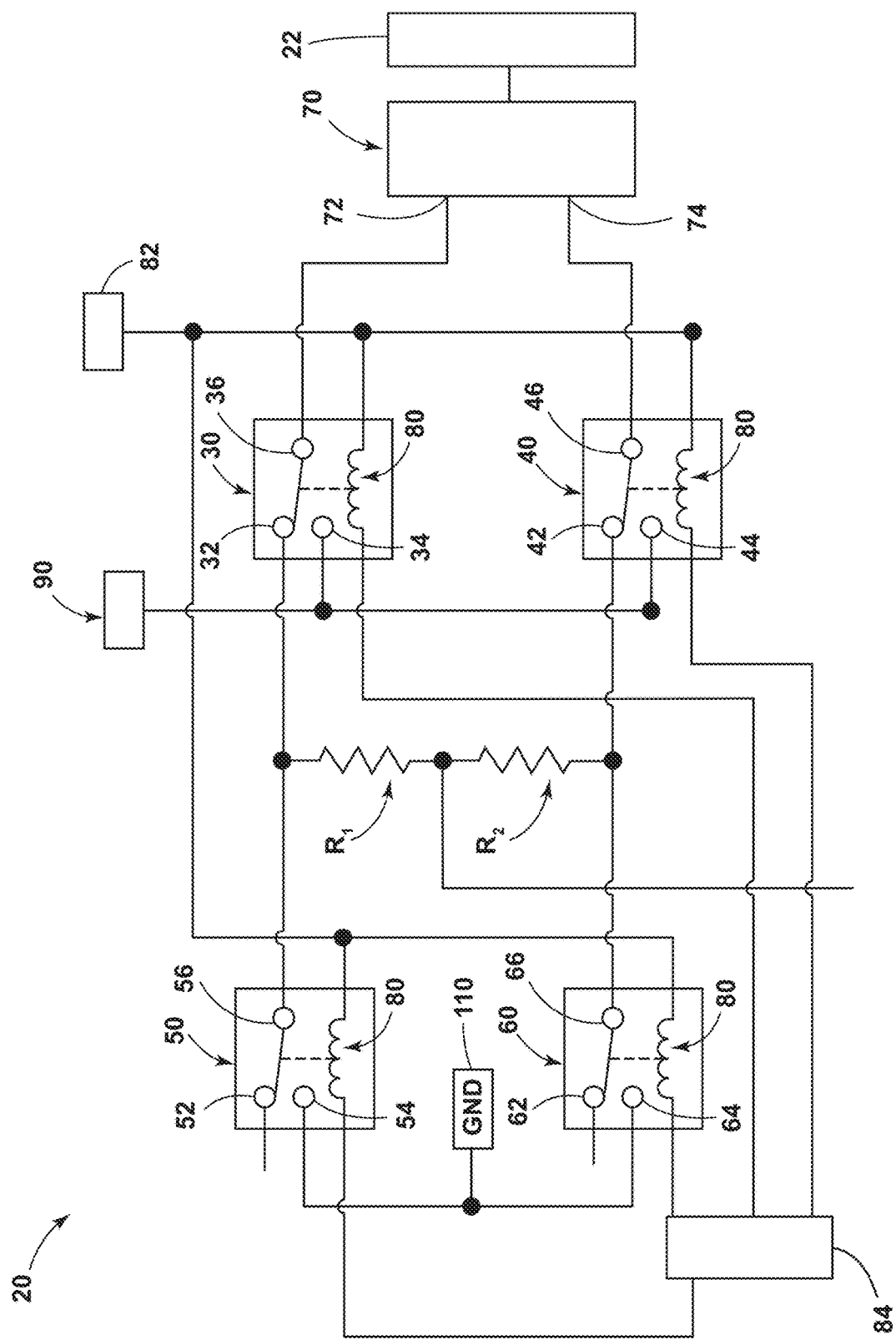
FIG. 2 is a schematic generally illustrating portions of an embodiment of an electrical assembly according to teachings of the present disclosure.

In embodiments, such as generally illustrated in FIG. 1, an electrical assembly 20 may include and/or be connected to a seat 22. The electrical assembly 20 may be configured to control, at least in part, movement of the seat 22. As generally illustrated in FIG. 2, an electrical assembly 20 may include one or more switches (e.g., relays 30, 40, 50, 60) and/or a motor 70. The switches 30, 40, 50, 60 may be relays, MOSFETS, and/or other switching devices. The switches (e.g., relays) 30, 40, 50, 60 may be electrically connected to the motor 70, and/or the relays 30, 40, 50, 60 may be configured to control the motor 70. The relays 30, 40, 50, 60 may be configured to control movement of the motor 70 in a first direction and/or a second direction (e.g., first and second rotational directions). A relay 30, 40, 50, 60 may include one or more of a variety of configurations that may function as an electrically operated switch. For example and without limitation, a relay 30, 40, 50, 60 may include a contactor.

With embodiments, a seat 22 may include a seat back 24 and/or a seat base 26. The relays 30, 40, 50, 60 may be configured to tilt/fold the seat back 24 and/or the seat base 26 up and down via the motor 70. The relays 30, 40, 50, 60 may be configured to selectively connect the motor 70 to an open circuit such that the motor 70 may rotate freely (e.g., such that the seat 22 may be manually folded). Connecting the motor 70 to an open circuit may prevent the motor 70 from acting as a generator (e.g., as a generator, the motor 70 may provide significant mechanical resistance to folding) when the seat 22 is manually folded. The seat 22 may include a support assembly 28A. The support assembly 28A may be connected to a track assembly 28B. The support assembly 28A may be selectively engageable with the track assembly 28B, and/or the support assembly 28A may be configured to move along the track assembly 28B (e.g., in the X-direction). The track assembly 28B may be connected to a mounting surface 28C, such as a vehicle floor.

With embodiments, such as generally illustrated in FIG. 2, the electrical assembly 20 may include a first relay 30, a second relay 40, a third relay 50, and/or a fourth relay 60. The first relay 30, the second relay 40, the third relay 50, and/or the fourth relay 60 may each include a first contact 32, 42, 52, 62, a second contact 34, 44, 54, 64, and/or a third contact 36, 46, 56, 66. The first relay 30 may be connected to the motor 70, the second relay 40, and/or the third relay 50. The second relay 40 may be connected to the motor 70, the first relay 30, and/or the fourth relay 60. The third relay 50 may be connected to the first relay 30 and/or the fourth relay 60. The fourth relay 60 may be connected to the second relay 40 and/or the third relay 50. The relays 30, 40, 50, 60 may be configured to selectively electrically connect the third contact 36, 46, 56, 66 with (i) the first contact 32, 42, 52, 62 (a first connection state) or (ii) the second contact 34, 44, 54, 64 (a second connection state).

In embodiments, the relays 30, 40, 50, 60 may each include a respective coil 80. When energized and/or de-energized, the coils 80 may change an electrical connection of the respective relay. For example and without limitation, energizing the coil 80 may cause a respective relay 30, 40, 50, 60 to switch from a first connection state to a second connection state (or vice versa).

With embodiments, the electrical assembly 20 may include and/or be connected to a controller 84. The controller 84 may be configured to control operation of one or more of the relays 30, 40, 50, 60. For example and without limitation, the controller 84 may be configured to energize the respective coils 80 of the relays 30, 40, 50, 60 to switch the relays 30, 40, 50, 60 between the first connection state and the second connection state.

In embodiments, such as generally illustrated in FIG. 2, the electrical assembly 20 may include and/or be connected to a power source 90, such as a vehicle battery. The power source 90 may be connected to the first relay 30 and/or the second relay 40. The power source 90 may be connected to the second contact 34 of the first relay 30 and/or the second contact 44 of the second relay 40. One or more of the relays 30, 40, 50, 60 may be configured to provide power from the power source 90 to the motor 70 to facilitate movement of the seat 22 (e.g., folding/tilting of the seat back 24 and/or seat base 26).

With embodiments, such as generally illustrated in FIG. 2, the electrical assembly 20 may include a motor 70. The motor 70 may be electrically connected to the first relay 30 and/or the second relay 40. The first relay 30 may be connected to a first contact 72 of the motor 70, and/or the first relay 30 may be configured to provide power to the motor 70 to rotate the motor 70 in a first direction. The second relay 40 may be connected to a second contact 74 of the motor 70, and/or the second relay 40 may be configured to provide power to the motor 70 to rotate the motor 70 in a second direction.

In embodiments, such as generally illustrated in FIG. 2, the first relay 30 may be connected to the motor 70, the second relay 40, the third relay 50, and/or the power source 90. The first contact 32 of the first relay 30 may be connected to the third contact 56 of the third relay 50; the second contact 34 of the first relay 30 may be connected to the power source 90; and/or the third contact 36 of the first relay 30 may be connected to the first contact 72 of the motor 70. The coil 80 of the first relay 30 may be connected to the controller 84 and/or an output 82. The output 82 may include, for example and without limitation, a ground (e.g., electrical ground) and/or one or more sensors configured to sense whether the corresponding coils 80 are activated and/or functioning properly.

With embodiments, the second relay 40 may be connected to the motor 70, the first relay 30, the fourth relay 60, and/or the power source 90. The first contact 42 of the second relay 40 may be connected to the third contact 66 of the fourth relay 60; the second contact 44 of the second relay 40 may be connected to the power source 90; and/or the third contact 46 of the second relay 40 may be connected to the second contact 74 of the motor 70. The coil 80 of the second relay 40 may be connected to the controller 84 and/or an output 82.

In embodiments, the third relay 50 may be connected to the first relay 30 and/or the fourth relay 60. The first contact 52 of the third relay 50 may be open and/or may not be connected directly to any external electrical components or a ground 110 (e.g., may function as an open contact/circuit). The second contact 54 of the third relay 50 may be connected to the second contact 64 of the fourth relay 60 and/or the ground 110. The third contact 56 of the third relay 50 may be connected to the first contact 32 of the first relay 30. The coil 80 of the third relay 50 may be connected to the controller 84 and/or an output 82.

With embodiments, the fourth relay 60 may be connected to the third relay 50, the first relay 30, and/or an open circuit. The first contact 62 of the fourth relay 60 may be open and/or may not be connected directly to any external electrical components or a ground 110 (e.g., may function as an open contact/circuit). The second contact 64 of the fourth relay 60 may be connected to the second contact 54 of the third relay 50 and/or the ground 110. The third contact 66 of the fourth relay 60 may be connected to the first contact 42 of the second relay 40. The coil 80 of the fourth relay 60 may be connected to the controller 84 and/or an output 82.

In embodiments, such as generally illustrated in FIG. 2, the electrical assembly 20 may include one or more components configured to detect a short in the electrical assembly 20. The components may include a first resistor $R_1$ and/or a second resistor $R_2$. The first resistor $R_1$ may be connected to/between the first contact 32 of the first relay 30, the third contact 56 of the third relay 50, and/or the second resistor $R_2$. The second resistor $R_2$ may be connected to/between the first contact 42 of the second relay 40, the third contact 66 of the fourth relay 60, and/or the first resistor $R_1$. The values of the first resistor $R_1$ and/or the second resistor $R_2$ may be relatively large. For example and without limitation, the first resistor $R_1$ and/or the second resistor $R_2$ may each include a resistance of about 5 kΩ or more or less. If there is a short in the system, such as at the first contact 72 and/or the second contact 74 of the motor 70, the first resistor $R_1$ and/or the second resistor $R_2$ may be configured to sense the short before the relays 30, 40, 50, 60 are energized.

With embodiments, such as generally illustrated in FIG. 2, the electrical assembly 20 may have a first state, a second state, and/or a third state. The first state of the electrical assembly 20 may correspond to the motor 70 not rotating in the first direction and/or the second direction (e.g., the power source 90 may not be connected to the motor 70). In the first state, the motor 70 may spin freely such that the seat 22 may be manually folded and/or moved, such as without substantial resistance (e.g., mechanical resistance) from the motor 70. In the first state, the motor 70 may be connected to an open circuit (e.g., the first contact 52 of the third relay 50 and/or the first contact 62 of the fourth relay 60) such as to limit or prevent mechanical resistance from the motor 70 when manually folding and/or moving the seat 22 (e.g., the open circuit may prevent the motor 70 from acting as a generator). When the electrical assembly 20 is in the first state, the first contact 32 of the first relay 30 may be connected to the third contact 36 of the first relay 30, the first contact 42 of the second relay 40 may be connected to the third contact 46 of the second relay 40, the first contact 52 of the third relay 50 may be connected to the third contact 56 of the third relay 50, and/or the first contact 62 of the fourth relay 60 may be connected to the third contact 66 of the fourth relay 60.

In embodiments, when the electrical assembly 20 is in the first state, the open contact of the third relay 50 (e.g., the first contact 52) and/or the open contact of the fourth relay 60 (e.g., the first contact 62) may be electrically connected to the first contact 72 of the motor 70 and/or the second contact 74 of the motor 70, respectively, and the power source 90 may be disconnected from the motor 70.

Figure 3:
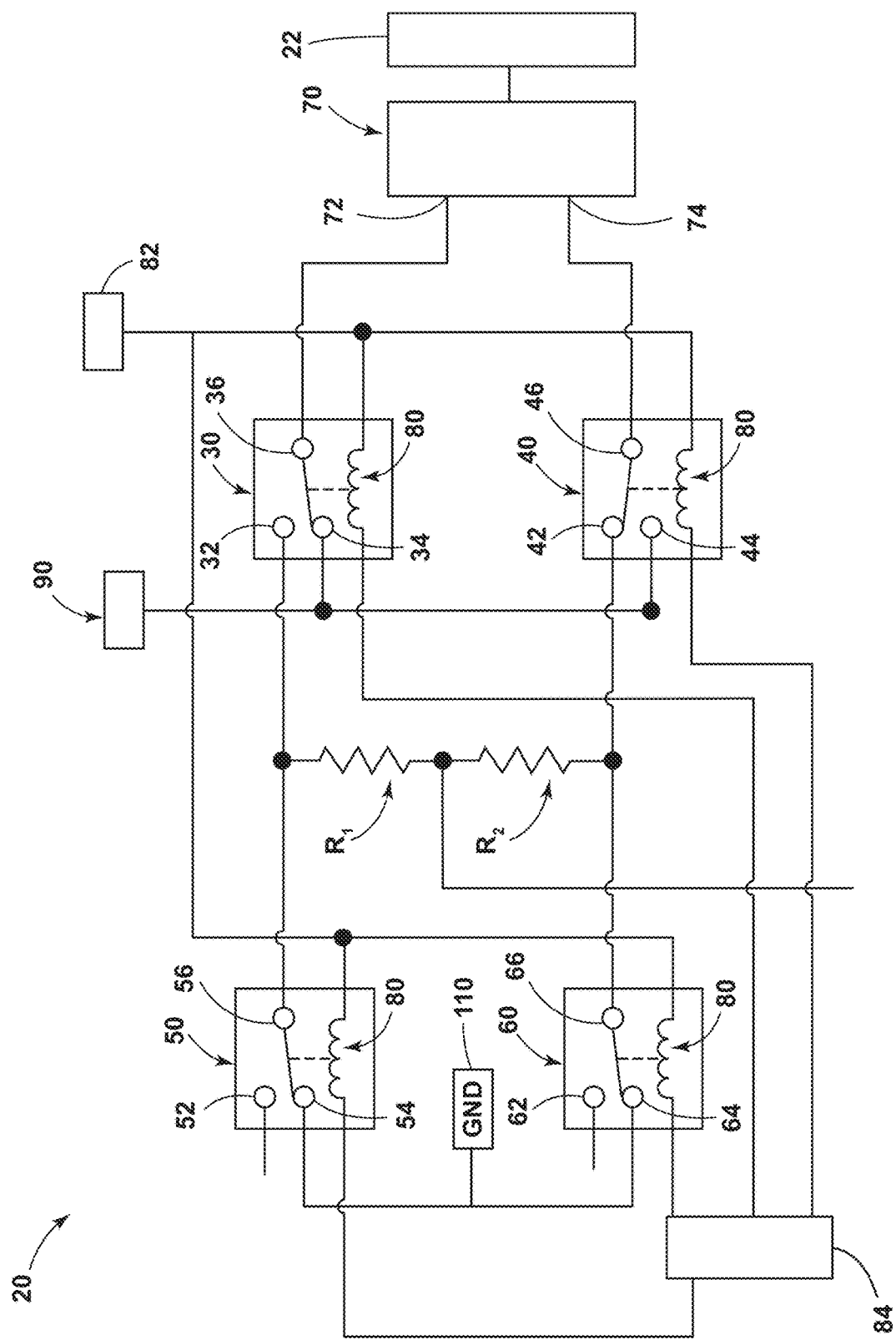
FIG. 3 is a schematic generally illustrating portions of an embodiment of an electrical assembly according to teachings of the present disclosure.

In embodiments, such as generally illustrated in FIG. 3, the electrical assembly 20 may have a second state. The second state of the electrical assembly 20 may correspond to the motor 70 rotating in a first direction. The relays 30, 40, 50, 60 may receive a signal from the controller 84 to change which contacts are electrically connected in the relays 30, 40, 50, 60. When the electrical assembly 20 changes between the first state and the second state, the coils 80 of the first relay 30, the third relay 50, and/or the fourth relay 60 may receive a signal from the controller 84. The first relay 30, the third relay 50, and/or the fourth relay 60 may change between the first connection state and the second connection state according to the signals. The second contact 34 of the first relay 30 may be connected to the third contact 36 of the first relay 30, the second contact 54 of the third relay 50 may be connected to the third contact 56 of the third relay 50, and/or the second contact 64 of the fourth relay 60 may be connected to the third contact 66 of the fourth relay 60. The first contact 42 of the second relay 40 may remain connected to the third contact 46 of the second relay 40.

With embodiments, when the electrical assembly 20 is in the second state, the first relay 30 may connect the power source 90 to the second contact 74 of the motor 70 (e.g., causing the motor 70 to rotate in the first direction). In the second state, the third relay 50 may connect the first contact 32 (which may not be connected to the third contact 36) of the first relay 30 to the ground 110, and/or the fourth relay 60 connect the first contact 42 of the second relay 40, which may be connected to the second contact 74 of the motor 70, to the ground 110. In the second state, the first contact 72 of the motor 70 may be connected to the power source 90 via the first relay 30, and the second contact 74 of the motor 70 may be connected to the ground 110 via the second relay 40 and the fourth relay 60.

Figure 4:
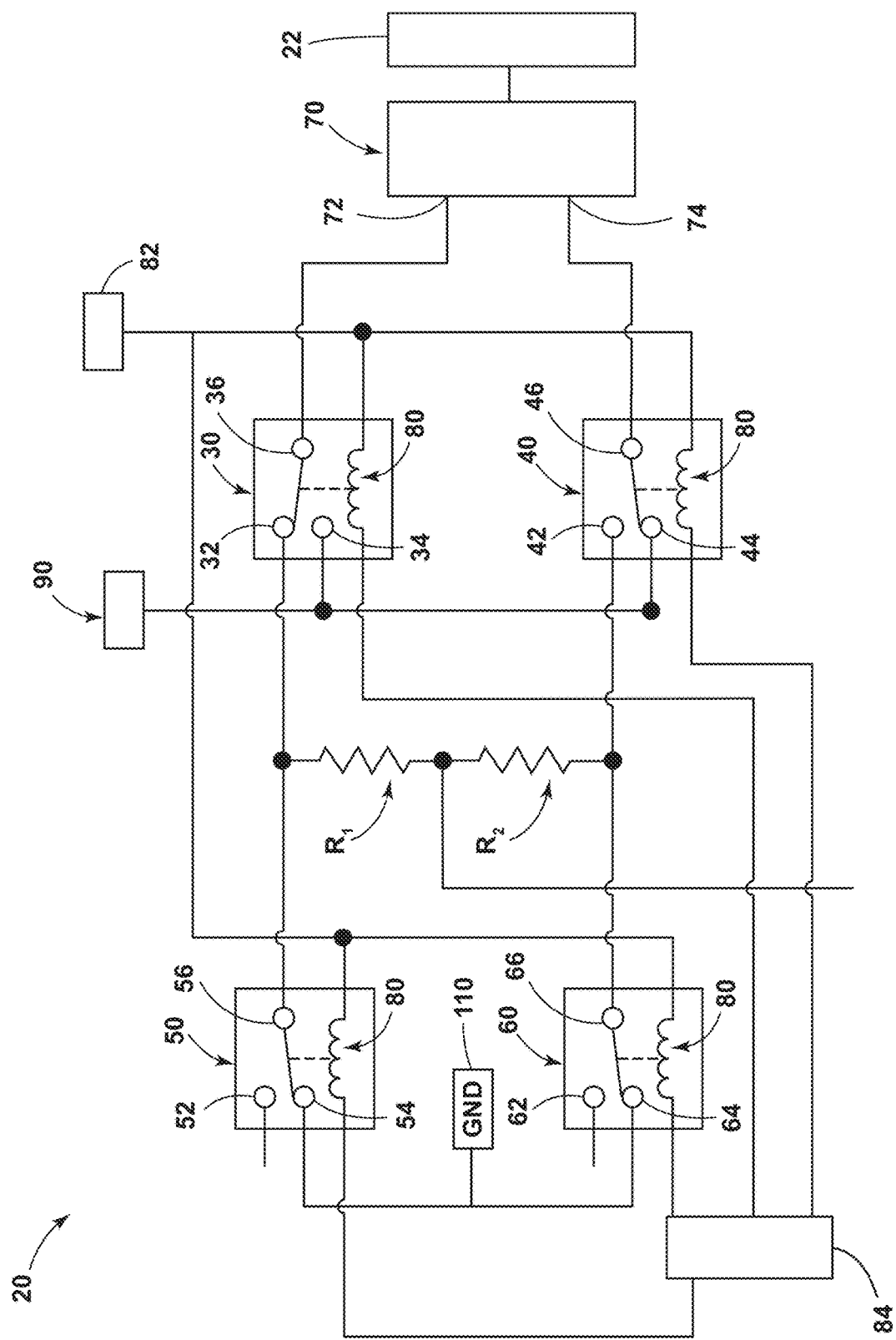
FIG. 4 is a schematic generally illustrating portions of an embodiment of an electrical assembly according to teachings of the present disclosure.

In embodiments, such as generally illustrated in FIG. 4, the electrical assembly 20 may include a third state. The third state of the electrical assembly 20 may correspond to the motor 70 rotating in a second direction. The relays 30, 40, 50, 60 may receive a signal from the controller 84 to change which contacts are connected in the relays 30, 40, 50, 60. When the electrical assembly 20 may change between the first state and the third state, the coils 80 of the second relay 40, the third relay 50, and/or the fourth relay 60 may receive a signal from the controller 84 so that second relay 40, the third relay 50, and/or the fourth relay 60 may flip from a first connection state to a second connection state. The second contact 44 of the second relay 40 may be connected to the third contact 46, the second contact 54 of the third relay 50 may be connected to the third contact 56, and/or the second contact 64 of the fourth relay 60 may be connected to the third contact 66.

With embodiments, when the electrical assembly 20 is in the third state, the first relay 30 may connect the power source 90 to the first contact 72 of the motor 70 (e.g., causing the motor 70 to rotate in the second direction). In the third state, the fourth relay 60 may connect the first contact 42 of the second relay 40 (which may not be connected to the third contact 46) to the ground 110, and/or the third relay 50 may connect the first contact 32 of the first relay 30, which may be connected to the first contact 72 of the motor 70, to the ground 110. In the third state, the first contact 72 of the motor 70 may be connected to the ground 110 via the first relay 30 and the third relay 50, and the second contact 74 of the motor 70 may be connected to the power source 90 via the second relay 40.

It should be understood that while embodiments of electrical assemblies 20 may be described herein in connection with a vehicle seat 22 for illustrative purposes, electrical assemblies 20 may be utilized in connection with other applications, including applications that do not involve vehicles or seats.

In embodiments, a controller 84 may include an electronic controller and/or include an electronic processor, such as a programmable microprocessor and/or microcontroller. In embodiments, a controller 84 may include, for example, an application specific integrated circuit (ASIC). A controller 84 may include a central processing unit (CPU), a memory (e.g., a non-transitory computer-readable storage medium), and/or an input/output (I/O) interface. A controller 84 may be configured to perform various functions, including those described in greater detail herein, with appropriate programming instructions and/or code embodied in software, hardware, and/or other medium. In embodiments, a controller 84 may include a plurality of controllers. In embodiments, a controller 84 may be connected to a display, such as a touchscreen display.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

It should be understood that a controller (e.g., controller 84), a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having both ROM, RAM, a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute one or more processors, multiple processors that are integrated into a single system or are distributed over and connected together through a communications network, and/or where the network may be wired or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. An electrical assembly, including:
a motor;
a first switch connected to a first contact of the motor;
a second switch connected to a second contact of the motor;
a third switch connected to the first switch;
a fourth switch connected to the second switch; and
wherein the first switch, the second switch, the third switch, and the fourth switch are configured to switch the electrical assembly between a first state, a second state, and a third state;
and when the electrical assembly is in the first state, at least one of the first contact and the second contact of the motor is connected to an open circuit, and the motor is configured to rotate substantially freely.

2. The electrical assembly of claim 1, wherein when the electrical assembly is in the second state, the first switch is configured to connect the motor to a power source to rotate the motor in a first direction; and
when the electrical assembly is in the third state, the motor is connected to said power source and an electrical ground, and the motor is configured to rotate in a second direction.

3. The electrical assembly of claim 1, the first switch, the second switch, the third switch, and the fourth switch each include a respective first contact, second contact, and third contact;
the first contact of the third switch is a first open contact;
the first contact of the fourth switch is a second open contact;
when the electrical assembly is in the first state:
(i) the first contact of the third switch is connected to the third contact of the third switch, which is connected to the first contact of the first switch, which is connected to the third contact of the first switch, which is connected to the first contact of the motor such the first contact of the motor to the first open contact; and
(ii) the first contact of the fourth switch is connected to the third contact of the fourth switch, which is connected to the first contact of the second switch, which is connected to the third contact of the second switch, which is connected to the second contact of the motor such that the second contact of the motor is connected to the second open contact.

4. The electrical assembly of claim 1, wherein when the electrical assembly is in the first state, the first switch is configured to connect the first contact of the motor to an open contact of the third switch, and the second switch is configured to connect the second contact of the motor to an open contact of the fourth switch.

5. The electrical assembly of claim 1, wherein when the electrical assembly is in the second state, the first switch is configured to connect the first contact of the motor to a power source, and the second switch is configured to connect the second contact of the motor to the fourth switch and an electrical ground; and the motor is configured to rotate in a first direction in the second state.

6. The electrical assembly of claim 1, wherein the first switch, the second switch, the third switch, and the fourth switch each include a respective first contact, second contact, and third contact;
the first contact of the third switch is a first open contact;
the first contact of the fourth switch is a second open contact;
the second contact of the third switch is connected to ground;
the second contact of the fourth switch is connected to ground;
the third contact of the third switch is connected to the first contact of the first switch; and
the third contact of the fourth switch is connected to the first contact of the second switch.

7. The electrical assembly of claim 1, wherein when the electrical assembly is in the third state, the first switch is configured to connect the first contact of the motor to the third switch and an electrical ground, and the second switch is configured to connect the second contact of the motor to a power source.

8. The electrical assembly of claim 1, wherein each of the first switch, the second switch, the third switch, and the fourth switch include a first contact, a second contact, and a third contact; and the first switch, the second switch, the third switch, and the fourth switch include a respective coil that is configured to be energized by a controller.

9. The electrical assembly of claim 1, including a first resistor and a second resistor; and the first resistor and the second resistor are configured to detect a short of the motor.

10. The electrical assembly of claim 1, wherein when the electrical assembly is in the first state, (i) the first switch is configured to connect the first contact of the motor to an open contact of the third switch, and (ii) the second switch is configured to connect the second contact of the motor to an open contact of the fourth switch;
when the electrical assembly is in the second state, (i) the first switch is configured to connect the first contact of the motor to a power source, (ii) the second switch is configured to connect the second contact of the motor to the fourth switch and an electrical ground; and (iii) the motor is configured to rotate in a first direction in the second state;
when the electrical assembly is in the third state, (i) the first switch is configured to connect the first contact of the motor to the third switch and the electrical ground, (ii) the second switch is configured to connect the second contact of the motor to the power source; and (iii) the motor is configured to rotate in a second direction.

11. The electrical assembly of claim 1, including:
a seat connected to the motor; and
a controller configured to control movement of the seat and operation of the motor via the first switch, the second switch, the third switch, and the fourth switch.

12. The electrical assembly of claim 4, wherein the open contact of the third switch is not directly connected with any electrical component or ground; and the second contact of the third switch is connected to ground.

13. The electrical assembly of claim 7, wherein, in the third state, the motor is configured to rotate in a second direction.

14. The electrical assembly of claim 8, wherein when the coils of the first switch, the second switch, the third switch, and the fourth switch are de-energized, the first contacts are electrically connected with the third contacts.

15. The electrical assembly of claim 8, wherein when the coils of the first switch, the second switch, the third switch, and the fourth switch are energized, the second contacts are electrically connected with the third contacts.

16. A method of operating an electrical assembly, the method comprising:

providing a first switch, a second switch, a third switch, a fourth switch, and a motor; and sending one or more control signals to the first switch, the second switch, the third switch, and/or the fourth switch to switch the electrical assembly between a first state, a second state, and a third state;

wherein the first state corresponds to the motor disconnected from a power source and connected to an open circuit; the second state corresponds to the motor rotating in a first direction; and the third state corresponds to the motor rotating in a second direction.

17. The method of claim 16, wherein the second switch, the third switch, and the fourth switch are energized when the electrical assembly is in the second state.

18. The method of claim 16, wherein the first switch, the third switch, and the fourth switch are energized when the electrical assembly is in the third state.

19. The method of claim 16, wherein the motor is configured to be manually rotated when the electrical assembly is in the first state.

20. The method of claim 16, wherein sending the one or more control signals includes controlling movement of a seat connected to the motor.

\* \* \* \* \*